United States Patent [19]
Défago et al.

[11] Patent Number: 4,543,102
[45] Date of Patent: Sep. 24, 1985

[54] AQUEOUS PRINTING INKS FOR TRANSFER PRINTING CONTAINING POLYVINYL ALCOHOL AND ACRYLATE POLYMER

[75] Inventors: Raymond Défago; Rolf Bäuerle, both of Riehen, Switzerland

[73] Assignee: Ciba-Geigy AG, Basel, Switzerland

[21] Appl. No.: 500,911

[22] Filed: Jun. 3, 1983

[30] Foreign Application Priority Data

Jun. 4, 1982 [CH] Switzerland ............... 3471/82

[51] Int. Cl.$^4$ ............... B41M 5/02; C09D 11/10; D06P 5/00
[52] U.S. Cl. ............... 8/471; 8/552; 8/582; 8/922; 106/22
[58] Field of Search ............... 8/471, 552; 106/22

[56] References Cited

U.S. PATENT DOCUMENTS

| 3,647,503 | 3/1972 | Mizutani et al. | 8/453 |
| 3,995,992 | 12/1976 | Defago et al. | 8/470 |
| 4,021,591 | 5/1977 | de Vries et al. | 8/468 |
| 4,093,415 | 6/1978 | Defago et al. | 8/471 |
| 4,272,292 | 6/1981 | Mizuno et al. | 106/22 |

FOREIGN PATENT DOCUMENTS 2547862 5/1976 Fed. Rep. of Germany .
2738084 3/1978 Fed. Rep. of Germany .

Primary Examiner—A. Lionel Clingman
Attorney, Agent, or Firm—Wenderoth, Lind & Ponack

[57] ABSTRACT

The invention relates to aqueous low-viscosity printing inks which, in addition to containing at least one sublimable dye suitable for transfer printing and optionally further ingredients, also contains a mixture of at least one polyvinyl alcohol and a polyacrylate and/or a styrene acrylic copolymer. Such printing inks are suitable in particular for printing supports for transfer printing on gravure printing machines.

7 Claims, No Drawings

AQUEOUS PRINTING INKS FOR TRANSFER PRINTING CONTAINING POLYVINYL ALCOHOL AND ACRYLATE POLYMER

The present invention relates to novel aqueous printing inks for transfer printing and to the use thereof for the production of supports for transfer printing on gravure printing machines.

Up to now, mainly organic printing inks, e.g. those based on ethanol, ethyl acetate or methyl ethyl ketone, have been used for producing transfer printing supports on gravure machines. The drawbacks of these printing inks are their inflammability and that they are pollutants.

The known aqueous printing inks containing e.g. a polacrylic resin alone as binder and thickener have not proved suitable in practice for use on gravure printing machines, as the drying procedure is too slow, the printed goods have an insufficiently level appearance, and the printing cylinders usually become clogged.

Accordingly, it is the object of the present invention to provide aqueous printing inks which do not have the drawbacks referred to above and which can therefore be used for producing supports for transfer printing on gravure machines.

This object is accomplished with an aqueous printing ink which comprises at least one polyvinyl alcohol and one polyacrylate and/or one styrene acrylic copolymer. Such inks are not inflammable because of their aqueous nature and they do not constitute an environmental nuisance. Further, they have the advantage that they dry rapidly, impart a very good appearance to the goods coloured with them, and, in addition, they do not clog the printing cylinders.

Accordingly, the present invention relates to novel aqueous printing inks which comprise at least one sublimable dye suitable for transfer printing, optionally further ingredients, at least one polyvinyl alcohol and one polyacrylate and/or one styrene acrylic copolymer.

The dyes suitable for transfer printing are known. They are preferably water-insoluble or sparingly soluble dyes, especially disperse dyes, which vaporise to at least 60% under atmospheric pressure in the temperature range from 150° to 220° C. in less than 60 seconds, and which are heat stable and are transferable without decomposition. However, it is also possible to use formulations which contain such dyes, e.g. those described in German Offenlegungsschrift Nos. 2 850 482 or 2 520 527.

As further ingredients the inks may contain e.g. antifoams, e.g. based on 2-ethyl-n-hexanol, and, if desired, components which regulate the pH value, e.g. ammonia, alkanolamines such as triethanolamine, or also sodium or potassium hydroxide. The pH of the inks is conveniently in the range from 6 to 9, preferably from 7 to 8.5.

Throughout this specification, the term "aqueous printing inks" shall be understood as comprising both a purely aqueous ink and an aqueous ink which additionally contains up to about 8% by weight of a water-miscible organic solvent, e.g. an alcohol, preferably isopropanol.

Critical to the invention is the addition of a mixture of at least one polyvinyl alcohol and one polyacrylate and/or one styrene acrylic copolymer. In general, these components are advantageously incorporated in the ink in a concentration of 5 to 20% by weight, based on the final formulation.

The polyvinyl alcohols employed are in particular those having a molecular weight above 10,000. It is preferred to use polyvinyl alcohols having a degree of polymerisation of about 300 to 5000 and a molecular weight of about 13,000 to 125,000, and which may be partially esterified, with advantage up to 10-20%.

The polyacrylate or styrene acrylic copolymer used as further component is in particular a compound also having a molecular weight above 10,000, viz. in the range from 10,000 to about 1,000,000. However, in addition to high molecular polyacrylates, those types are also preferably used which have a molecular weight of 10,000 to 25,000.

By polyacrylate is meant a polymeric acrylic acid whose carboxyl groups may be partially or completely esterified with a lower aliphatic saturated alcohol, preferably methanol or ethanol. The esterified types may be e.g. a polymer of methyl acrylate or ethyl acrylate or also a copolymer of these monomers. It is preferred to use as polyacrylate a copolymer of methyl acrylate and ethyl acrylate, said copolymer containing the monomers in the ratio of about 1:1.

The term "styrene acrylic copolymer" will be understood as meaning in the context of this invention a copolymer of the methyl and ethyl esters of acrylic acid and styrene. Preferred copolymers are those containing about 20% of methyl acrylate and ethyl acrylate and about 80% of styrene.

The ratio of polyvinyl alcohol to polyacrylate and/or styrene acrylic copolymer is preferably 1:1 to 1:10. It is convenient to use the polyvinyl alcohol and polyacrylate in the form of an aqueous or aqueous/alcoholic solution. The styrene acrylic copolymer is preferably employed in the form of an aqueous emulsion.

The printing inks of this invention are of low viscosity and have stable viscosity values which are preferably in the range from about 10 to 300 mPas. Inks which additionally contain an organic solvent should have a flash point above 50° C. Level prints with sharp contours are obtained in transfer printing using supports printed with the inks of the present invention.

The transfer printing process is generally known and is described in detail for example in French patent specification Nos. 1 223 330, 1 334 829 and 1 585 119. In this process, supports which are printed with suitable inks are brought into close contact with the substrate to be printed and the dye is transferred to the substrate under the action of heat, with or without the application of pressure.

Suitable supports for transfer printing are heat stable and dimensionally stable planar structures preferably having a smooth surface, e.g. of paper, cellophane and metal sheets (cf. British patent specification No. 1 190 889). The preferred support is paper.

The transfer is carried out in conventional manner by the action of heat. The treated supports are brought into contact with the textile materials to be printed and kept at 150°-220° C. until the dyes applied to the support have transferred to the material. The time required for the transfer is usually from 5 to 60 seconds.

After the heat treatment, the printed material is separated from the support. It is not necessary to subject the printed material to an aftertreatment: either a steam treatment to fix the dye or washing to improve the fastness properties.

Suitable substrates for transfer printing are in particular textile materials, preferably planar structures such as fleeces, felts, carpets and especially wovens and knits made of synthetic fibres, in particular polyester fabrics.

The following Examples illustrate the invention without implying any restriction to what is described therein. Parts and percentages are by weight. Viscosities are determined with a Brookfield RVT viscosimeter (spindle 1, 20 rpm, 20° C.).

EXAMPLE 1

To 800 g of a diluent of the following composition:
635 g of water
5 g of triethanolamine
10 g of a mixture of antifoam based on 2-ethyl-n-hexanol
200 g of polyvinyl alcohol (degree of polymerisation about 530; mol. wt. about 20,000) in water (solids content 20%)
150 g of a styrene acrylic copolymer (20% of acrylate, 80% of styrene in the form of an aqueous emulsion; solids content 48%)
are added 200 g of an aqueous formulation containing 90 g of the dye of the formula

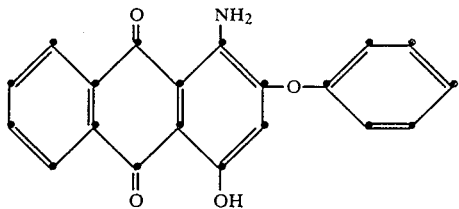

(the remainder consisting of water and the dispersants customarily employed in liquid formulations), to give 1000 g of a printing ink with which paper is printed by gravure printing. The ink has a viscosity of 180 mPas.

The ink is applied to selected areas or to the whole surface of the paper. The printed paper is then dried at 100° C. for a few seconds. It is fast to rubbing and can be used at any time for printing manmade fibres by the dry heat transfer printing process. The material is printed by pressing the paper support and a polyester fabric together for 30 seconds at 210° C. in a transfer press. Intense patterns with sharp contours are obtained on the fabric after the dye has transferred from the support to the polyester substrate.

EXAMPLE 2

The procedure of Example 1 is repeated using 800 g of a diluent of the following composition:
630 g of water
10 g of a mixture of antifoam based on 2-ethyl-n-hexanol
10 g of a thickener based on polyacrylic acid (mol. wt. about $1 \times 10^6$)
200 g of polyvinyl alcohol (degree of polymerisation about 530; mol. wt. about 20,000) in water (solids content 20%)
150 g of a styrene acrylic copolymer (20% of acrylate, 80% of styrene in the form of an aqueous emulsion; solids content 48%).
Paper is printed with this ink (viscosity 195 mPas) by gravure printing. Intense red patterns with sharp contours are obtained on the polyester fabric after the dye has transferred from the paper support to the polyester substrate.

EXAMPLE 3

Paper is printed by gravure printing with a printing ink of the following composition: 40 g of an aqueous formulation containing 18 g of the dye of the formula

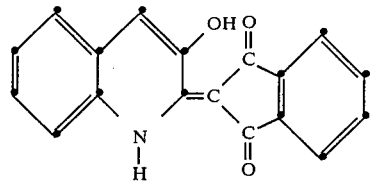

and 20 g of an aqueous formulation containing 9 g of the dye of the formula

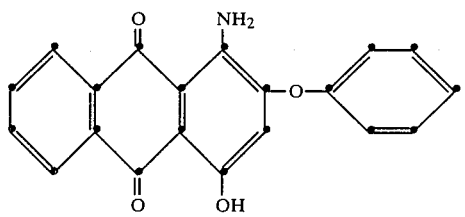

and 20 g of an aqueous formulation containing 7.2 g of the dye of the formula

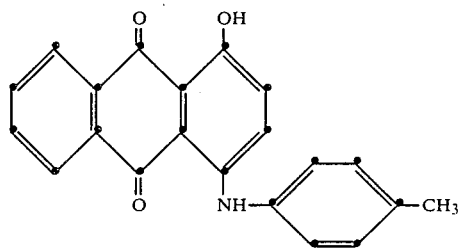

are added to 920 g of a diluent of the following composition:
590 g of water
10 g of a mixture of antifoam based on 2-ethyl-n-hexanol
250 g of polyvinyl alcohol (degree of polymerisation about 530; mol. wt. about 20,000) in water (solids content 20%)
150 g of a methyl acrylate/ethyl acrylate copolymer (ratio of the monomers about 1:1; mol.wt. about 22,000) in the form of a solution in water/isopropanol (2:1); solids content 40%).

The ready for use printing ink has a viscosity of 210 mPas. Paper is printed as described in Example 1. A brown print with sharp contours is obtained by transfer printing polyester fabric with this support.

EXAMPLE 4

The procedure of Example 1 is repeated using 800 g of a diluent of the following composition:
420 g of water
5 g of a triethanolamine
10 g of a mixture of antifoam based on 2-ethyl-n-hexanol
250 g of a methyl acrylate/ethyl acrylate copolymer (ratio of the monomers about 1:1; mol. wt. about 22,000) in the form of an aqueous solution (solids content 24%)

185 g of polyvinyl alcohol (degree of polymerisation about 530; mol. wt. about 20,000) in water (solids content 20%) and 130 g of polyvinyl alcohol, 11 to 14% esterified, in water (solids content 10%) (degree of polymerisation about 2000; mol. wt. about 100,000).

The printing ink so obtained has a viscosity of 200 mPas.

EXAMPLE 5

The procedure of Example 1 is repeated using as diluent 800 g of the following composition:

732 g of water 15 g of an antifoam mixture based on 2-ethyl-n-hexanol 3 g of ammonia as 25% aqueous solution 200 g of a styrene acrylic copolymer (20% of acrylate, 80% of styrene in the form of an aqueous emulsion; solids content 48%)

50 g of polyvinyl alcohol (degree of polymerisation about 530; mol. wt. 20,000) in water (solids content 20%).

The printing ink so obtained has a viscosity of 11 mPas and a pH of 8.5.

Intense red prints with sharp contours are obtained on polyester fabric printed with supports to which this ink has been applied.

What is claimed is:

1. An aqueous printing ink having a viscosity of 10 to 300 mPas which, in addition to the aqueous base, comprises
    (a) at least one sublimable disperse dye suitable for transfer printing on polyester materials,
    (b) at least one polyvinyl alcohol, and
    (c) at least one member of the group consisting of a polyacrylate, a styrene acrylic copolymer and mixtures thereof, said ink being free of solid inert fillers.

2. An aqueous printing ink according to claim 1 having a total content of 5 to 20% by weight of components b and c.

3. An aqueous printing ink according to claim 1 wherein the polyvinyl alcohol, polyacrylate and styrene acrylic copolymer each have a molecular weight of more than 10,000.

4. An aqueous printing ink according to claim 1 which additionally contains an antifoam.

5. In a method of printing supports for transfer printing which comprises applying an aqueous printing ink to a transfer printing support, the improvement wherein an aqueous printing ink as defined in claim 1 is employed.

6. A support for transfer printing printed by the method as according to claim 5.

7. A textile material printed from a support for transfer printing as defined in claim 6.

* * * * *